United States Patent [19]
Oweis et al.

[11] Patent Number: 5,651,255
[45] Date of Patent: Jul. 29, 1997

[54] HIGH EFFICIENCY LOOSE MULTI-FOIL THERMAL INSULATION STRUCTURE WITH INTEGRAL LOAD BEARING SYSTEM

[75] Inventors: Salah M. Oweis, Ellicott City, Md.; James G. Snyder, Hanover, Pa.; Louis d'Ussel, Towson, Md.; Denis Virey, Paris, France

[73] Assignee: Saft America, Inc., Valdosta, Ga.

[21] Appl. No.: 595,915

[22] Filed: Feb. 6, 1996

[51] Int. Cl.$^6$ ........................................ F17C 11/00
[52] U.S. Cl. .............................. 62/46.2; 429/120
[58] Field of Search ................... 62/45.1, 46.2, 62/46.3, 50.7; 138/129, 133, 134, 144, 158

[56] References Cited

U.S. PATENT DOCUMENTS

| | | | |
|---|---|---|---|
| 4,258,756 | 3/1981 | Gilman et al. | 138/142 |
| 5,347,816 | 9/1994 | Nelson et al. | 62/46.2 |

Primary Examiner—Ronald C. Capossela
Assistant Examiner—Pamela A. O'Connor
Attorney, Agent, or Firm—Sughrue, Mion, Zinn, Macpeak & Seas

[57] ABSTRACT

A loosely wrapped multi-layer thermal insulation structure is provided by coextensively winding, a continuous thin metal foil and a superimposed continuous low thermal conductivity porous material spacer about a mandrel, preferably functioning as an inner metallic shell for such loosely wound metal foil and spacer assembly. A plurality of narrow low thermal conductivity porous material strips are interposed between adjacent turns of the spiral wound metal foil and spacer assembly at laterally spaced positions throughout the assembly to form localized, narrow dense wound material areas defining an integral load-bearing system for the thermal insulation structure. Longitudinally extending permanent getter material strips may be bonded to the outer peripheral surface of the inner metallic shell defining gas passages for gas diffusion within the metal foil and spacer assembly. The metal foil may be perforated to facilitate that action.

6 Claims, 4 Drawing Sheets

HIGH EFFICIENCY LOOSE MULTI-FOIL THERMAL INSULATION STRUCTURE WITH INTEGRAL LOAD BEARING SYSTEM

FIELD OF THE INVENTION

This invention relates to a thermal jacket formed of loose multi-foil layers, and more particularly to a load bearing system integrated into the thermal jacket.

BACKGROUND OF THE INVENTION

Vacuum insulation structures for high-temperature batteries have created efficient insulation assemblies effecting heat transfer by radiation, conduction through the solid structure, and conduction through residual gases within the loose multi-foil insulation. Such multi-foil insulation may consist of thin metal foil separated by glass or other thermal insulator material. Attempts have been made to strengthen the casing walls of the loosely wrapped multi-foil insulation and to form a satisfactory load bearing insulation by compressing multi-foil sheet structures at elevated temperatures. Those attempts have resulted in partial sintering of the glass paper where such is used to separate aluminum foil sheets. As a result, while the thermal jacket strength is adequate, the thermal conductivity thereof is significantly increased.

U.S. Pat. No. 5,347,816 entitled "VARIABLE PRESSURE THERMAL INSULATING JACKET" and issued Sept. 20, 1994 to Paul A. Nelson et al. is representative of developments within this art. In the various devices forming embodiments of the invention, a thermal jacket having a closed volume capable of being evacuated to form an insulating jacket and incorporating a loosely wrapped insulation layer is interposed between an outside jacket casing and one or more bipolar batteries. In one form, multi-foil insulation layers are created by wrapping sectional widths of the multi-foils separated by glass paper in edge overlapping, side-by-side fashion to double the density of the multi-foil material at the overlapping ends of the wrapped sections, thereby assisting in maintaining the position of the centrally located battery or batteries without compression of the main body of insulation.

While improving the ability of the loose multi-layer structure to support the inner cylinder, the density increase of the edge overlapped foil content layers tends to create high thermal conductivity areas at the spaced longitudinal positions defined by the edge overlapping multi-foils.

It is therefore an object of this invention to create a high efficiency thermal insulation structure with a load bearing system which does not materially detract from the thermal insulation of the assembly provided by the loose multi-foil material and to eliminate the thermal short circuit and leak problems at the interface between the sectional multi-foil structures of the prior art as exemplified by the prior art above.

It is a further object of the invention to provide a permanent getter within such structure which absorbs all kinds of gases but hydrogen, and which functions as a reversible getter when heated to release hydrogen once the enclosure has been made thermally conductive while reabsorbing hydrogen during cooling when the enclosure is required to perform in the insulation mode.

It is a further object of the present invention to provide such high efficiency thermal insulation structure with an effective, integrated load bearing system utilizing loose multi-foil layers in which the foil content is perforated to ensure radial gas diffusion and which facilitates degassing without adversely affecting the thermal insulation performance of the structure.

DESCRIPTION OF THE PREFERRED EMBODIMENT

Figure 1:
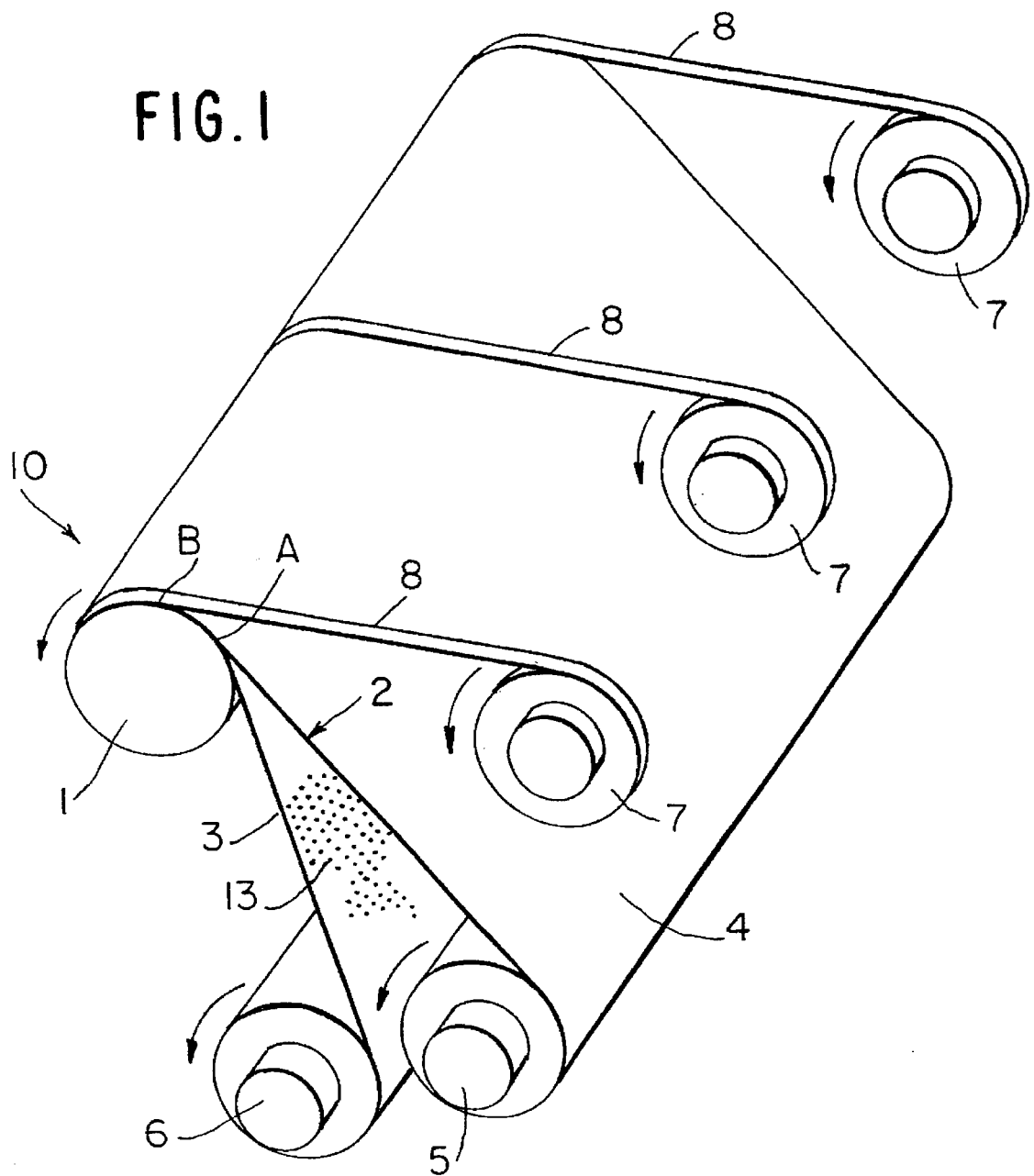
FIG. 1 is a perspective view of the method of manufacturing a high efficiency thermal insulation structure with its integral load bearing system forming a preferred embodiment of the invention.
Figure 2:
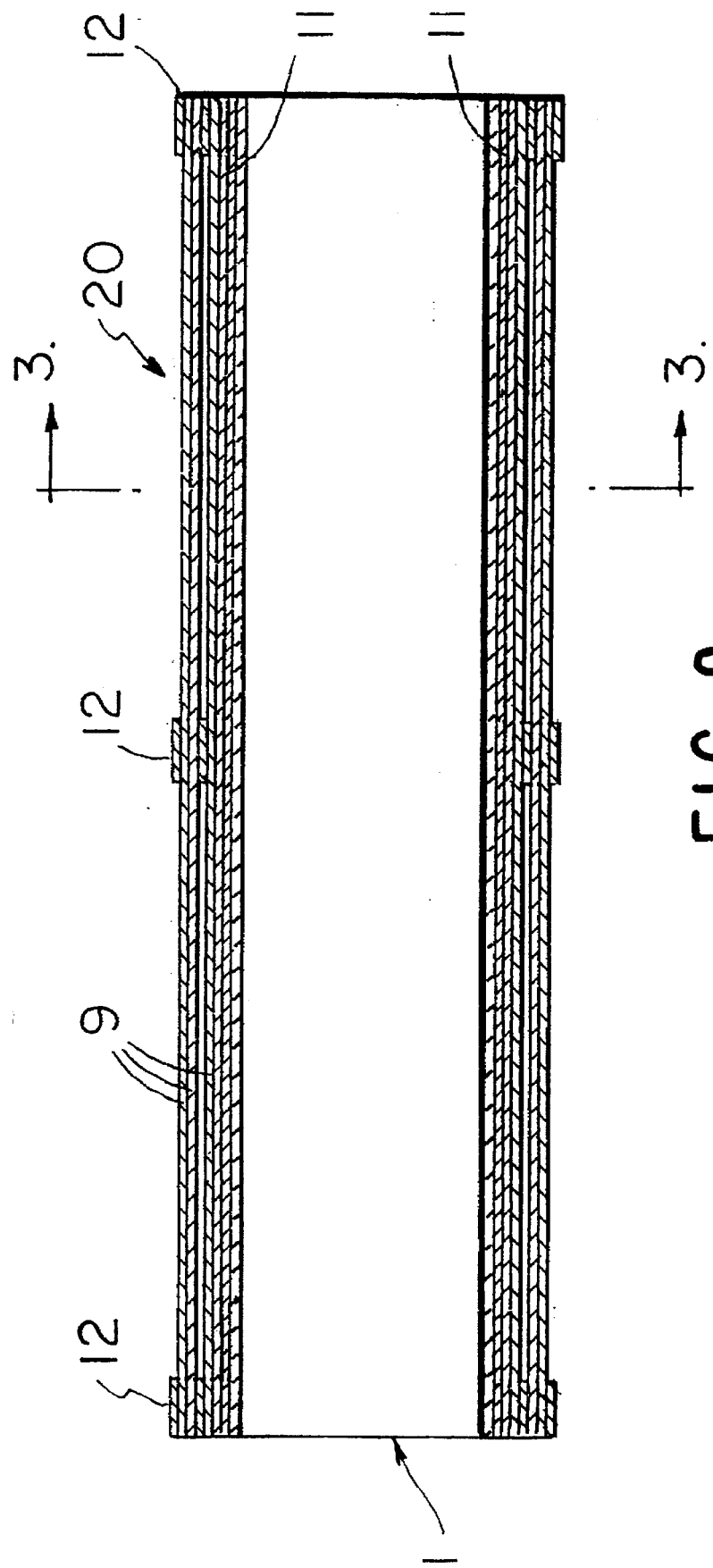
FIG. 2 is a longitudinally sectional view of an assembly of an inner cylindrical metallic shell containing the material to be kept at the desired temperature and the loose foil multi-layer insulation system about the periphery thereof.

The schematic perspective view of FIG. 1 illustrates a setup for a machine or system indicated at 10 for wrapping a multi-insulation system indicated generally at 20, FIG. 2, about a cylinder or inner metallic shell 1. The multi-layer insulation system (MLI) is composed of a low emissivity metal foil 3 such as aluminum foil which functions to reverberate the heat flux, and a porous low thermal conductivity material spacer 4 which may consist of glass fabric between the wound or wrapped foil 3 layers 9, FIG. 2. The two materials, aluminum foil 3 and glass fabric spacer 4 are wound together in a continuous fashion by conventional means, with the aluminum foil 3 being fed from bobbin 6 and the glass fabric spacer 4 from bobbin 5. Despite the thermal losses due to the conduction of heat through the aluminum foil material 3, thermal analysis by computer modelling has shown that the multi-insulation system 20 formed thereby is more efficient than the multi-sheet system folded around such cylinder such as that employed in the U.S. Pat. No. 5,347,816 discussed above, which is prone to thermal leak shorts at the interface between the ends of the multiple sheets.

In the present invention, there is a lack of thermal shorts or thermal leaks since the two-layer foil and spacer assembly is wrapped continuously but loosely without tension but, being loosely wound, cannot act as a mechanical support for the inner cylindrical metallic shell.

To bear the load of the inner cylindrical metallic shell or container, the present invention employs in the process depicted in FIG. 1, winding of additional strips 8 of the porous, low-conductivity material such as that forming spacer 4. In the illustrated embodiment, the glass fabric strips 8 are integrally wound at B about the previously wound upstream joined aluminum foil 3 and the glass fabric 4 after contacting the inner cylindrical metallic sheet 1 periphery at point A. The narrow strips 8 of the same porous, low conductivity material as that at 4 on short axial length bobbins 7 are spaced longitudinally of the wound structure, about the inner cylindrical metallic shell 1, which is rotating counter-clockwise as indicated by the arrow to effect the creation of the wrapped assembly 20 of FIG. 2. In the schematic representation in FIG. 1, the means or mechanism for rotating and wrapping the various materials about the periphery of the inner cylindrical metallic shell 1 are now shown, with members 1, 6 and 7 rotating about their axes. As seen in the longitudinal sectional view, FIG. 2, this forms localized, narrow, dense areas 12 of the multi-layer insulation system 20. In the illustrated embodiment, there are areas 12 at opposite ends and an annular area 12 within the center of the assembly. The applicants have found that the dense areas 12 define a load bearing system which enhances the thermal insulation over those using solid ceramic donuts and avoids the risk of thermal shorts at the axial ends of the assembly 20.

The completion of the high efficiency, loose filling thermal insulation system 20, FIG. 2, with its integral loading bearing system is achieved by encapsulating the multi-layer insulation system 20 with the inner cylindrical metallic shell 1 captured internally within a sealed, outer metallic container (not shown) put under high vacuum using a tube thereof (not shown) as an interface with a source of vacuum such as a vacuum pump (not shown). Under such arrangements, the tube may be crimped when the material degassing (by vacuum effect) is completed and the correct vacuum level is achieved internally of the assembly 20.

In this portion of the process, the difference in thermal expansion due to the temperature gradient between the inner and outer containers (inner cylindrical metallic shell 1 and the outer container) provides for an additional compression of the dense areas 12 of the multi-layer insulation system 20, utilizing the additional spiral wrapped narrow strips 8 of porous low conductivity material such as a woven or non-woven glass fabric. The result is significant improvement in the mechanical support function of the multi-layer insulation system 20 as so modified.

If the system is required to be reversible, by switching from an insulating mode to a conductive mode and vice versa, an intelligent getter arrangement may be employed on the exterior of the multi-layer insulation system 20, at an end or otherwise.

Figure 3:
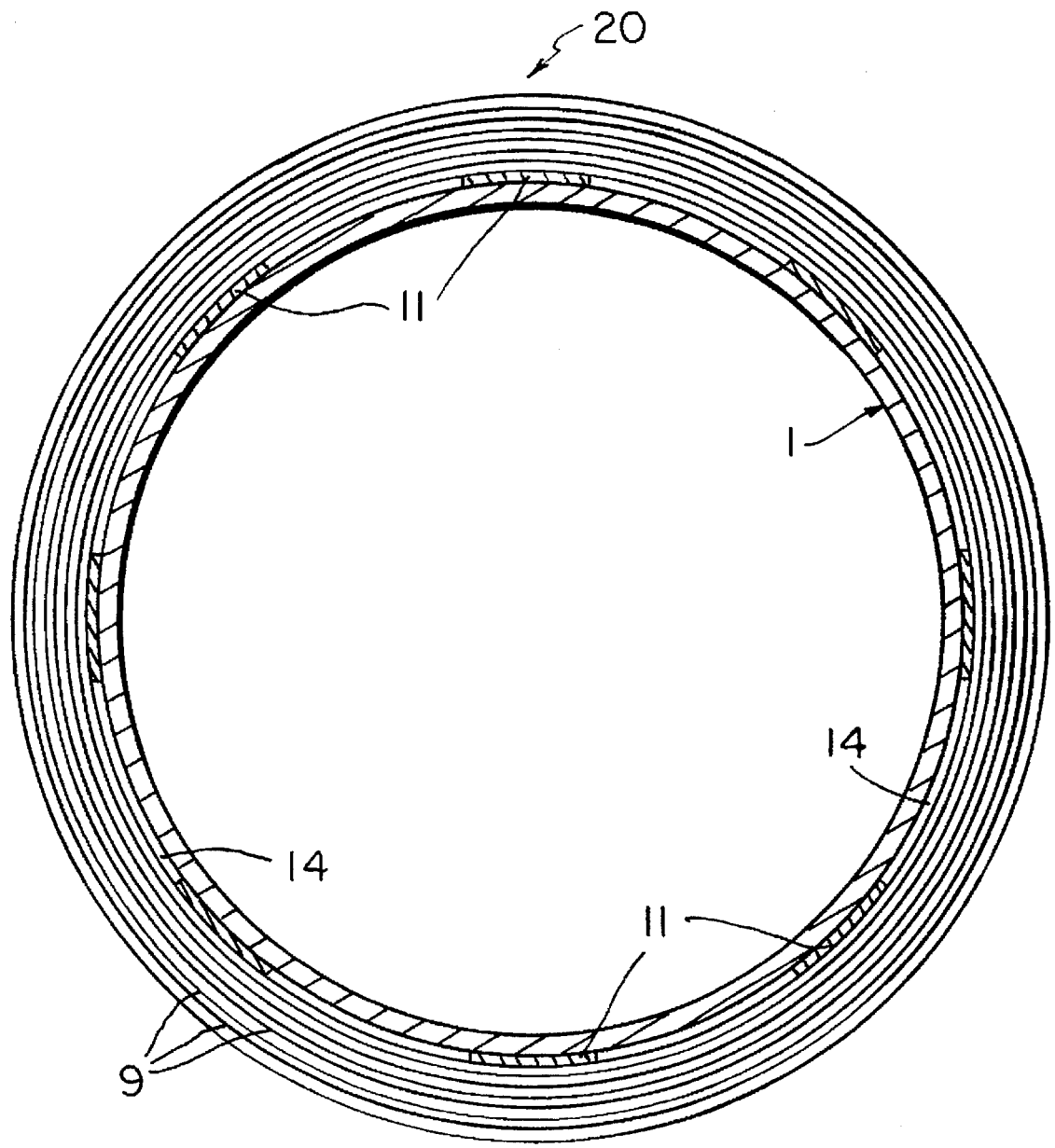
FIG. 3 is a cross-section of the high efficiency thermal insulation structure of FIG. 2, with integral load bearing system formed by the method illustrated in FIG. 1 and incorporating a permanent getter between the inner cylinder and the loose foil multiple layer of the insulation structure.
Figure 4:
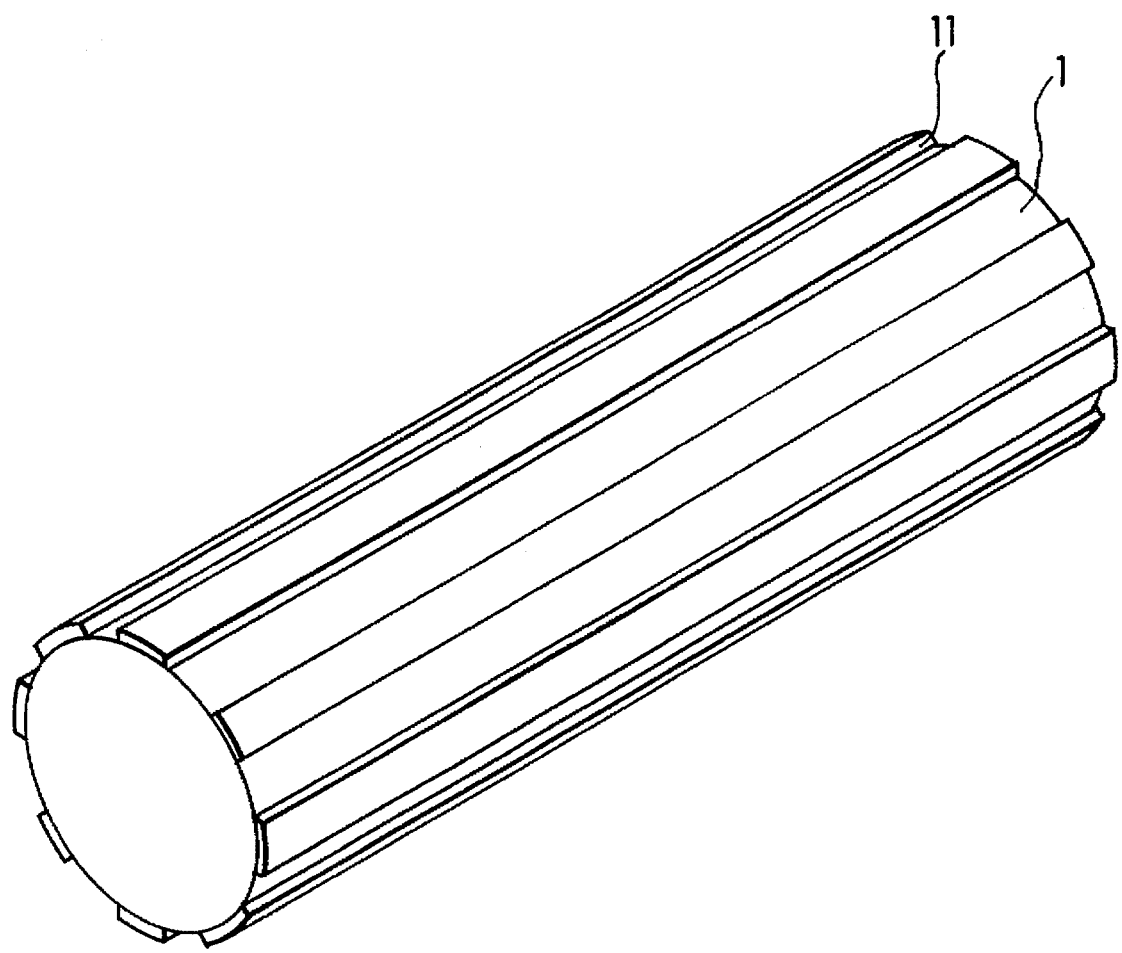
FIG. 4, is a perspective view of the tube 1 and getters 11 prior to winding of the wrapped assembly 20 of FIG. 3.

In the illustrated embodiment, FIG. 3, a permanent getter takes the form of spaced, narrow, longitudinal strips 11. The getter material may be the same as that at 30 within U.S. Pat. No. 5,347,816, such as that under the trade designation St 737, provided by SAE Getters/U.S.A., Inc. Such permanent getter may be composed of multiple circumferentially spaced strips 11, spot welded on the exterior face of the inner cylindrical metallic shell 1. With the multiple insulation system 20 being wound over the longitudinal strips, there are some longitudinal spaces 14 between the wound spiral foil layers 9 of the multi-layer insulation system 20 and the exterior surface of the inner cylindrical metallic shell 1. The spaces 14 ensure diffusion of the gases throughout the foil layers 9.

To improve the diffusion of hydrogen in the multi-layer insulation system 2, the metal foil is perforated as at 13, FIG. 1. The perforations 13 also assist in degassing during the opposite mode of operation.

The hydrogen gas is employed for its high thermal conductivity. The permanent getter 11 effects the initial outgassing of the materials and the makeup of the permanent getter is selected so as to absorb all kinds of gases but not hydrogen.

In contrast, by heating the reversible getter (not shown), the reversible, intelligent getter releases hydrogen when the enclosure is required to be thermally conductive while by cooling the same, the intelligent getter functions to reabsorb the hydrogen when the structural assembly 20 is required to function in an insulation mode. The intelligent getter material absorbs and desorbs a control gas such as hydrogen to control the overall thermal conductivity of the insulation package.

While a preferred embodiment has been shown and described, it should be understood that the scope of the invention is limited by the claims and not to the illustrative embodiment which is employed to assist in understanding a specific embodiment of the invention.

What is claimed is:

1. A high efficiency, loosely wrapped multi-layer thermal insulation structure comprising:

a coextensive wound continuous thin metal foil and a superimposed continuous low thermal conductivity porous material spacer sized to said thin metal foil, said spacer being interposed between respective turns of said metal foil, and a plurality of narrow low thermal conductivity porous material strips interposed between adjacent turns of said wound metal foil and spacer assembly at laterally spaced positions throughout the assembly, thereby forming localized, narrow, dense wound material areas within said assembly constituting an integral load bearing system for said thermal insulation structure.

2. The high efficiency, loosely wrapped multi-layer thermal insulation structure as claimed in claim 1, wherein said narrow, located, dense wound material areas are adjacent opposite ends of the wound structure and at least one laterally spaced position intermediate of said areas at said opposite ends of said structure, thereby minimizing thermal shorts at the ends of the wound structure.

3. The high efficiency, loosely wrapped multi-layer thermal insulation structure as claimed in claim 1, wherein said metal foil is perforated to facilitate radial gas diffusion throughout said wound metal foil and spacer assembly.

4. The high efficiency, loosely wrapped multi-layer thermal insulation structure as claimed in claim 1, wherein said metal foil comprises aluminum foil, and said low thermal conductivity porous material spacer comprises a glass fabric.

5. The high efficiency, loosely wrapped multi-layer thermal insulation structure as claimed in claim 1, wherein said wound metal foil and spacer assembly is wrapped about an inner cylindrical metallic shell sized to said wound metal foil and spacer assembly, and wherein a permanent getter is interposed between the outer periphery of said inner cylindrical metallic shell and said wound metal foil and spacer assembly.

6. The high efficiency, loosely wrapped multi-layer thermal insulation structure as claimed in claim 5, wherein said permanent getter comprises getter strips bonded to the outer peripheral surface of the inner metallic shell, with said strips extending longitudinally of the shell periphery at circumferentially spaced positions to facilitate diffusion of gas throughout the thermal insulation structure.

* * * * *